(12) United States Patent
Strandborg et al.

(10) Patent No.: US 12,348,876 B2
(45) Date of Patent: Jul. 1, 2025

(54) HEAD MOUNTED DEVICE AND TRACKING METHOD

(71) Applicant: Varjo Technologies Oy, Helsinki (FI)

(72) Inventors: Mikko Strandborg, Hangonkylä (FI); Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 118 days.

(21) Appl. No.: 18/315,580

(22) Filed: May 11, 2023

(65) Prior Publication Data

US 2024/0380984 A1 Nov. 14, 2024

(51) Int. Cl.
| | |
|---|---|
| *H04N 23/74* | (2023.01) |
| *G02B 27/01* | (2006.01) |
| *G06T 7/70* | (2017.01) |
| *H04N 23/71* | (2023.01) |
| *H04N 23/76* | (2023.01) |
| *H04N 23/56* | (2023.01) |

(52) U.S. Cl.
CPC .......... *H04N 23/74* (2023.01); *G02B 27/0172* (2013.01); *G06T 7/70* (2017.01); *H04N 23/71* (2023.01); *H04N 23/76* (2023.01); *G02B 2027/0138* (2013.01); *G02B 2027/014* (2013.01); *G02B 2027/0178* (2013.01); *G02B 2027/0187* (2013.01); *G06T 2207/10152* (2013.01); *H04N 23/56* (2023.01)

(58) Field of Classification Search
CPC ........ H04N 23/74; H04N 23/71; H04N 23/76; H04N 23/56; G02B 27/0172; G02B 2027/0138; G02B 2027/014; G02B 2027/0178; G02B 2027/0187; G06T 7/70; G06T 2207/10152
See application file for complete search history.

(56) References Cited

U.S. PATENT DOCUMENTS

| | | | | |
|---|---|---|---|---|
| 2015/0229819 A1* | 8/2015 | Rivard | ................. | H04N 23/743 |
| | | | | 348/362 |
| 2015/0229898 A1* | 8/2015 | Rivard | ................... | H04N 23/56 |
| | | | | 348/223.1 |
| 2021/0034894 A1* | 2/2021 | Ebihara | ................ | G06V 40/197 |
| 2021/0405760 A1* | 12/2021 | Schoen | ................ | G06F 3/0304 |
| 2024/0212090 A1* | 6/2024 | Selan | ........................ | G06T 3/40 |

* cited by examiner

*Primary Examiner* — Yogesh K Aggarwal
(74) *Attorney, Agent, or Firm* — Ziegler IP Law Group, LLC.

(57) ABSTRACT

A system includes a tracking device and a light source. The tracking device has a camera and a first controller. The camera captures a first image and a second image. The first image is captured during a first period of time (t0-t1) and the second image is captured during a second period of time (t2-t3). The first controller is coupled to the camera and configured to obtain first timing information and second timing information; form timing instructions; and communicate timing instructions to light source over a communication interface. The light source is configured to use timing instructions to illuminate first amount of light and a second amount of light. The first controller is further configured to calculate image intensity difference between the first and second image to identify from first image pixel(s) illuminated by the light source.

19 Claims, 5 Drawing Sheets

HEAD MOUNTED DEVICE AND TRACKING METHOD

TECHNICAL FIELD

The present disclosure relates to systems for tracking positions of light sources. The present disclosure also relates to methods for tracking positions of light sources.

BACKGROUND

In recent decades, various techniques related to head-mounted display (HMD) devices require precise and real-time tracking of an input device (for example, such as a user-interaction controller) that is to be used with the HMD devices for interacting within extended-reality (XR) environments. Some existing input devices comprise light-emitting elements (for example, such as light-emitting diodes (LEDs)) which are arranged thereon in a manner that the input devices are visible from all angles and orientations of a perspective of a user using the HMD device. Thus, the input devices are generally tracked by tracking/detecting the light-emitting elements arranged thereon.

However, existing techniques and equipment for tracking the input devices has several limitations associated therewith. Existing techniques and equipment are incapable of accurately and conveniently tracking an input device when other external background light-emitting elements and/or background noise are present in a real-world environment, in addition to light-emitting elements of the input device. This is because presence of the external background light-emitting elements and/or the background noise creates interference and confusion while tracking the light-emitting elements of the input device. Therefore, this makes tracking of the input device highly cumbersome and error-prone. Resultantly, user experience of interacting within an XR environment using the input device is extremely compromised, and becomes unrealistic and non-immersive. Moreover, some techniques are based on detecting and geometrically matching light illuminated from the light-emitting elements of the input device and light incoming from the external background light-emitting elements against small clusters of infrared (IR) light. However, this approach is highly time-consuming, and often results in a wastage of processing resources used for the tracking.

Therefore, in light of the foregoing discussion, there exists a need to overcome the aforementioned drawbacks associated with existing tracking techniques and equipment.

SUMMARY

The present disclosure seeks to provide a system for tracking a position of a light source. The present disclosure also seeks to provide a method for tracking a position of a light source. An aim of the present disclosure is to provide a solution that overcomes at least partially the problems encountered in prior art.

In a first aspect, an embodiment of the present disclosure provides a system comprising a tracking device and a light source, wherein the tracking device comprises a camera and a first controller coupled to the camera, the first controller being configured to:
obtain a first timing information associated with a first period of time (t0-t1) and a second timing information associated with a second period of time (t2-t3), wherein the first period of time and the second period of time do not overlap;
form timing instructions based on the first timing information and the second timing information;
communicate the timing instructions to the light source over a communication interface; and
control the camera to capture a first image and a second image during the first period of time (t0-t1) and the second period of time (t2-t3), respectively;
wherein the light source is configured to use the timing instructions to illuminate a first amount of light during the first period of time and a second amount of light during the second period of time, and
wherein the first controller is further configured to calculate an image intensity difference between the first image and the second image to identify from the first image at least one pixel illuminated by the light source.

In a second aspect, an embodiment of the present disclosure provides a method for tracking a position of a light source in a first image, the method comprising:
obtaining a first timing information associated with a first period of time (t0-t1) and a second timing information associated with a second period of time (t2-t3), wherein the first period of time and the second period of time do not overlap;
forming timing instructions based on the first timing information and the second timing information, and communicating the timing instructions to the light source over a communication interface;
using the timing instructions to control the light source to illuminate a first amount of light during the first period of time and a second amount of light during the second period of time;
capturing, with a camera, a first image and a second image during the first period of time (t0-t1) and the second period of time (t2-t3), respectively;
identifying from the first image at least one pixel illuminated by the light source, by calculating an image intensity difference between the first image and the second image; and
using the identified at least one pixel to determine a position of the light source from the first image.

Embodiments of the present disclosure substantially eliminate or at least partially address the aforementioned problems in the prior art, and facilitate a simple, fast, accurate, and improved tracking of the light source by way of using the image intensity difference, in real time or near-real time.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers. Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising a tracking device and a light source, wherein the tracking device comprises a camera and a first controller coupled to the camera,
the first controller being configured to:
obtain a first timing information associated with a first period of time (t0-t1) and a second timing information associated with a second period of time (t2-t3), wherein the first period of time and the second period of time do not overlap;
form timing instructions based on the first timing information and the second timing information;
communicate the timing instructions to the light source over a communication interface; and
control the camera to capture a first image and a second image during the first period of time (t0-t1) and the second period of time (t2-t3), respectively;
wherein the light source is configured to use the timing instructions to illuminate a first amount of light during the first period of time and a second amount of light during the second period of time, and
wherein the first controller is further configured to calculate an image intensity difference between the first image and the second image to identify from the first image at least one pixel illuminated by the light source.

In a second aspect, an embodiment of the present disclosure provides a method for tracking a position of a light source in a first image, the method comprising:
obtaining a first timing information associated with a first period of time (t0-t1) and a second timing information associated with a second period of time (t2-t3), wherein the first period of time and the second period of time do not overlap;
forming timing instructions based on the first timing information and the second timing information, and communicating the timing instructions to the light source over a communication interface;
using the timing instructions to control the light source to illuminate a first amount of light during the first period of time and a second amount of light during the second period of time;
capturing, with a camera, a first image and a second image during the first period of time (t0-t1) and the second period of time (t2-t3), respectively;
identifying from the first image at least one pixel illuminated by the light source, by calculating an image intensity difference between the first image and the second image; and
using the identified at least one pixel to determine a position of the light source from the first image.

The present disclosure provides the aforementioned system and the aforementioned method for tracking a position of the light source in the first image. The light source is controlled to operate according to the timing instructions. Hence, based on the timing instructions, the camera is operatively synchronized with the light source in a manner such that the first image is captured while the light source illuminates the first amount of light during the first period of time, and the second image is captured while the light source illuminates the second amount of light during the second period of time. Then the image intensity difference, arising due to a difference in illumination by the light source in consecutive images, is used to identify the at least one pixel from the first image. Moreover, even in presence of other external background light-emitting elements and/or background noise, the at least one pixel is identified accurately as one of the first image and the second image represents the light source at a relatively high intensity than another of the first image and the second image. Hence, this makes tracking of the position of the light source simple, accurate, and convenient.

Beneficially, the light source is mounted on a user-interaction controller of the tracking device. This allows to track a position and an orientation of the user-interaction controller. This also allows to leverage information about the position and the orientation of the user-interaction controller to enable a user to use the user-interaction controller to manoeuvre, for example, through an extended-reality environment. This potentially leads to a realistic, immersive viewing experience for the user, when using the tracking device. Furthermore, the system can be used for any tracking scenario, such as, for example, head-mounted display (HMD) tracking controllers, self-tracking controller, and similar. Furthermore, the system and the method facilitate in tracking the light source in computationally-efficient and time-efficient manner. The system and the method are simple, robust, fast, reliable, and can be implemented with ease.

The present disclosure provides the aforementioned system and the aforementioned method for tracking a position of the light source from the first image. Herein, the light source is accurately detected using the processing steps of the aforementioned method. The light source is controlled to match an exposure of the camera with respect to time, and the image intensity difference, arising from a difference in the amount of light illuminated by the light source in consecutive images captured by the camera, is used to identify the at least one pixel illuminated by the light source. Consequently, the light source itself is identified, and such identifications are used to increment a confidence level of an algorithm implementing the processing steps of the aforementioned method.

Additionally, optionally, the aforementioned system and method can be beneficially implemented with a plurality of light sources, wherein individual light sources can be identified and distinguished from each other by controlling time slots during which said light sources are illuminated in a time-multiplexed manner. Advantageously, the system efficiently reduces the processing requirements by simplifying the process of tracking the positions of such light sources.

Throughout the present disclosure, the term "tracking device" refers to a device that is used for at least tracking a light source. It will be appreciated that the tracking device may also be capable of displaying images to the user. Optionally, the tracking device is a head-mounted display (HMD) device. The term "head-mounted display" device refers to a specialized equipment that is configured to present an extended-reality (XR) environment to the user when said HMD device, in operation, is worn by the user on his/her head. The HMD device is implemented, for example, as an XR headset, a pair of XR glasses, and the like, that is operable to display a visual scene of the XR environment to the user. The term "extended-reality" encompasses virtual reality (VR), augmented reality (AR), mixed reality (MR), and the like.

Alternatively, optionally, the tracking device is implemented as one of: a teleport device, a remote device, a computing device. Herein, the term "teleport device" refers to a specialized equipment that is capable of facilitating virtual teleportation. Examples of the remote device include, but are not limited to, a drone, a vehicle, and a robot. Examples of the computing device include, but are not limited to, a laptop, a computer, a tablet, a phablet, a personal digital assistant, a workstation, and a console.

Throughout the present disclosure, the term "camera" refers to an equipment that is operable to detect and process light signals from a real-world environment, to capture images of the real-world environment.

Optionally, a given camera is implemented as a visible-light camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, and a monochrome camera. Alternatively, optionally, a given camera is implemented as a combination of a visible-light camera and a depth camera. Examples of the depth camera include, but are not limited to, a Red-Green-Blue-Depth (RGB-D) camera, a ranging camera, a Light Detection and Ranging (LiDAR) camera, a Time-of-Flight (ToF) camera, a Sound Navigation and Ranging (SONAR) camera, a laser rangefinder, a stereo camera, a plenoptic camera, and an infrared (IR) camera. As an example, the given camera may be implemented as the stereo camera. The camera typically comprises at least an optical element (for example, such as a lens), and an image sensor.

Throughout the present disclosure, the term "image" refers to a visual representation of the real-world environment, which encompasses not only colour information represented in the image, but also other attributes associated with the image (for example, such as, depth information, transparency information, luminance information, brightness information, and the like).

Notably, the first image and the second image are captured by the camera during the first period of time (t0-t1) and during the second period of time (t2-t3), respectively, wherein the first period of time is different from and does not overlap with the second period of time. The first image and the second image are captured consecutively (i.e., one after the other), and not simultaneously. Herein, the term "period of time" refers to a duration (namely, a length) of time between a start time and an end time. Thus, the first period of time is a duration of time between a start time 't0' and an end time 't1', whereas the second period of time is a duration of time between a start time 't2' and an end time 't3'. A given period of time may be expressed in terms of millisecond (ms), second (s), minute (min), or similar. The term "given period of time" encompasses the first period of time and/or the second period of time. In some implementations, the first period of time and the second period of time are consecutive periods of time with no programmable delay in between the two aforesaid periods of time. In other implementations, the first period of time and the second period of time are consecutive periods of time with a programmable delay in between the two aforesaid periods of time. It will be appreciated that an exposure of the camera could be adjusted accordingly during a given period of time, for capturing a given image. The term "exposure" refers to an amount of light that reaches an image sensor of the camera, when the camera is exposed to a real-world environment for capturing the given image.

Throughout the present disclosure, the term "controller" refers to hardware, software, firmware, or a combination of these, for controlling an overall operation of a given device. It is to be understood that a given controller may be implemented as any of: a processor, a microprocessor, a microcontroller. Notably, the first controller controls an overall operation of the tracking device. In some implementations, the first controller is implemented as a processor of the tracking device. In other implementations, the tracking device comprises an external computing device that is communicably coupled to a head-mounted display device; in such a case, the first controller is implemented as a processor of the external computing device. In such a case, at least a part of all the aforementioned processing tasks of the first controller is performed at the external computing device.

Throughout the present disclosure, the "timing information" refers to information indicative of a start time and an end time of a given period of time. It will be appreciated that a given timing information optionally also encompasses information pertaining to the programmable delay between the first period of time and the second period of time. By "obtaining timing information", it is meant that the first controller is configured to either generate the timing information or receive the timing information from a processor of the tracking device.

Throughout the present disclosure, the term "timing instruction" refers to a time-based instruction that is sent from the tracking device to the light source, for controlling the light source to illuminate a given amount of light during the given period of time according to said time-based instruction. In other words, the timing instructions are provided as commands to the light source to schedule its operation of illuminating the given amount of light during the given period of time. Optionally, when forming the timing instructions, the given timing information is used to specify at least one of: when the light source should be activated, when the light source should be deactivated, how much amount of light the light source should emit in the given period of time.

In an example, the light source may illuminate X1 amount of light during the first period of time, and illuminate X2 amount of light during the second period of time according to the timing instructions sent to the light source, the X1 amount of light being greater than the X2 amount of light. The timing instructions could also be utilised by the first controller to control the camera for capturing a given image during a given period of time while the light source is illuminating a respective amount of light. The timing instructions could be in form of a text, a high-level code, a low-level code, or similar.

The communication interface is used to interface (i.e., communicably connect) the first controller to the light source, for communicating the timing instructions therebetween. The communication interface could be implemented to use a communication network. It will be appreciated that the communication network may be wired, wireless, or a combination thereof. Examples of the communication network may include, but are not limited to, Internet, a local network (such as, a TCP/IP-based network, an Ethernet-based local area network, an Ethernet-based personal area network, a Wi-Fi network, and the like), Wide Area Networks (WANs), Metropolitan Area Networks (MANs), a telecommunication network, a radio network, and Bluetooth®. The communication interface can be provided via any well-known protocol, for example, such as Internet Protocol (IP), Wireless Access Protocol (WAP) Frame Relay, or Asynchronous Transfer Mode (ATM). Examples of the communication interface include, but are not limited to, a DisplayPort interface, a mobile industry processor interface (MIPI), a high-definition multimedia interface (HDMI), a transistor-transistor logic (TTL) interface, a complementary metal oxide semiconductor (CMOS) interface, and a serial peripheral interface (SPI). The timing instructions are communicated to the light source, in real time or in near-real time.

Throughout the present disclosure, the term "light source" refers to an element from which light emanates. In other words, the light source, when activated, emits light. Optionally, the light source comprises one of: an infrared light-emitting diode, a visible-light emitting diode. Optionally, the light source is an active light source. This means the light source provides the light by emitting the light itself. Alternatively, optionally, the light source is a passive light source. This means that the light source provides the light by reflecting the light incident thereupon. Examples of the light source include, but are not limited to, a light-emitting diode (LED), a laser. The laser may be a vertical-cavity surface-emitting laser (VCSEL), an edge-emitting laser (EEL), or the like.

The light source is configured to illuminate based on the timing instructions received from the first controller. In this regard, the light source and the camera are operatively synchronized in a manner that the first image is captured while the light source illuminates the first amount of light during the first period of time. Similarly, the second image is captured while the light source illuminates the second amount of light during the second period of time. Herein, synchronization of the camera with the light source ensures that a time difference between illuminating the given amount of light (namely, a first amount of light and a second amount of light) and capturing the given image (namely, a first image and a second image) is minimal.

Notably, the first image represents the light source when the light source illuminates the first amount of light that is captured by the camera. Similarly, the illumination of the second amount of light is captured by the camera and is represented in the second image. Herein, the first amount of light is different from the second amount of light. This happens when an intensity of the light emitted by the light source is different during the illumination of the first amount of light and the second amount of light.

It will be appreciated that both the first image and the second image are captured from an almost same pose of the camera; shifting of position of image features between the first image and the second image due to any small change in the pose of the camera can be overcome by performing reprojection from one pose to another pose. Therefore, most pixels in the first image and the second image are common as these pixels represent same external light sources that are present in the real-world environment whereat the light source is also present. Thus, intensities of these pixels are almost similar in both the first image and the second image. Moreover, remaining pixels in the first image and the second image are pixels that represent the light source. Since the first image represents the light source illuminating the first amount of light, the second image represents the light source illuminating the second amount of light, and the first amount of light is different from the second amount of light, an intensity of at least one pixel representing the light source in the first image would be considerably different from an intensity of at least one corresponding pixel representing the light source in the second image. Optionally, an intensity of a given pixel is expressed by a pixel value of the given pixel. It will be appreciated that the term "pixel value" of the given pixel encompasses not only colour information to be represented by the given pixel, but also other attributes associated with the given pixel (for example, such as depth information, brightness information, transparency information, luminance information, and the like).

In an embodiment, the first amount of light corresponds to turning the light source on and the second amount of light corresponds to turning the light source off. In other words, the camera captures the first image when the light source is turned on during the first period of time. Hence, pixels of the first image represent a combination of the intensity of the first amount of light along with the intensity of the light of the external light sources. On the other hand, the camera captures the second image when the light source is turned off during the second period of time. Hence, pixels of the second image represent the intensity of the light of the external light sources. Thereafter, upon comparing the pixels of the first image and corresponding pixels of the second image, the at least one pixel is identified that represents the light source.

Due to a difference in illumination of the first amount of light and the second amount of light, the at least one (same) pixel would have different intensity in the first image and in the second image. Consequently, this leads to a difference in an image intensity of the first image and an image intensity of the second image. Optionally, when calculating the image intensity difference between the first image and the second image, the first controller is configured to employ at least one image processing algorithm. Such image processing algorithms are well-known in the art. As an example, an image intensity of the first image may be calculated by calculating an intensity of each pixel in the first image. Similarly, an image intensity of the second image may be calculated by calculating an intensity of each pixel in the second image. When an intensity of a pixel in the first image is X1, and an intensity of a corresponding pixel in the second image is X2, an intensity difference between said pixel and the corresponding pixel can be calculated as a difference between their respective intensities. In this way, the image intensity difference can be calculated by calculating the intensity difference between each pixel in the first image and its corresponding pixel in the second image in a pixel-by-pixel manner.

Alternatively, optionally, the image intensity difference can be calculated for a plurality of groups of neighbouring pixels. A given group of neighbouring pixels can be formed by selecting those neighbouring pixels whose intensities lie within a predefined threshold value from each other. In such a case, the image intensity difference can be calculated by calculating the intensity difference between each group of pixel in the first image and its corresponding group of pixels in the second image in a group-by-group manner.

Optionally, the image intensity difference is used as additional information to improve accuracy of tracking the light source, due to the inverse power law. According to the inverse power law, an expected image intensity difference is proportional to a square root of a difference in the first amount of light and the second amount of light. Thus, when the image intensity difference that is calculated from the first image and the second image does not match the expected image intensity difference, it is likely due to other external light sources and/or background noise in the first image and the second image.

Optionally, the first controller is configured to determine a deviation in the (calculated) image intensity difference from the expected image intensity difference, and correct the intensity of pixels in at least one of: the first image, the second image, based on the determined deviation. This potentially improves the accuracy of tracking the light source. Additionally, optionally, the first controller is configured to correct the intensity of the pixels in the at least one of: the first image, the second image, when the determined deviation is greater than a predefined threshold deviation.

Moreover, optionally, the light source comprises a light emitter and a second controller, wherein the second controller is configured to receive the timing instructions and control the light emitter based on the timing instructions. Herein, the term "light emitter" refers to a component of the light source that produces/emits light for the light source. Optionally, the light emitter comprises a plurality of light-emitting elements, wherein a given light-emitting element is a light-emitting diode. The plurality of light-emitting elements could be spatially arranged in a constellation-like manner, throughout the light source. Furthermore, the light emitter emits the light of a specific wavelength, for example, lying in a visible spectrum (such as, for example, visible light) or in an electromagnetic spectrum (such as, for example, infrared light). Optionally, the second controller is communicably coupled to the first controller, and to the light emitter. When controlling the light emitter based on the timing instructions, the light emitter of the light source and the camera are operatively synchronized in a manner that the first image is captured while the light emitter illuminates the first amount of light during the first period of time. Similarly, the second image is captured while the light emitter illuminates the second amount of light during the second period of time. Optionally, the second controller controls an overall operation of the light source. In some implementations, the second controller is implemented as a microcontroller of the light source.

Optionally, the light source further comprises a reflective element, wherein the reflective element reflects the light of the light emitter. Herein, the term "reflective element" refers to an optical element having reflective optical properties. Examples of the reflective element may include, but are not limited to, a mirror, a lens, a prism, a waveguide. When the light emitter emits the light, the light from the light emitter is incident upon a surface of the reflective element wherefrom the light is reflected to the real-world environment whereat the tracking device is present. It will be appreciated that when the camera is arranged at a position and/or an orientation such that the light emitted by the light emitter is not completely incident upon an image sensor of the camera, the reflective element could then be used to reflect the light emitted by the light emitter towards the image sensor of the camera. The term "image sensor" refers to a device which detects light from the light source and from external light sources present in the real-world environment at its photosensitive surface, to capture a plurality of image signals.

As mentioned earlier, the first amount of light could correspond to turning the light source on and the second amount of light could correspond to turning the light source off. In this regard, the light source would be called as "turned on" when the light source illuminates the first amount of light, whereas the light source would be called as "turned off" when the light source illuminates the second amount of light. Herein, turning the light source off does not necessarily mean that the light source is completely off, i.e., does not illuminate any light or the second amount of light is zero. It can also mean that the second amount of light is non-zero i.e., the light source is very dimly-lit during the second period of time, and thus the light source illuminates some amount of light that is considerably lower than the first amount of light. Optionally, in such a case, the second amount of light could be less than a predefined threshold amount of light.

Optionally, the first amount of light is greater than the second amount of light. In some implementations, when the light source illuminates the first amount of light, the light source is turned on (namely, activated) during the first period of time and is well-lit, whereas when the light source illuminates the second amount of light, the light source is completely turned off (namely, deactivated) during the second period of time, and is not lit at all. In such implementations, the second amount of light is almost zero and the light emitter of the light source is supplied with a zero current.

In other implementations, when the light source illuminates the first amount of light, the light source is turned on during the first period of time and is well-lit, whereas when the light source illuminates the second amount of light, the light source is relatively dimly-lit during the second period of time as compared to the first period of time. In such implementations, the second amount of light is more than the predefined threshold amount of light, and the light emitter is supplied with a non-zero current (i.e., a lower current as compared to a current that is supplied to the light emitter during the first period of time).

Optionally, during the second period of time, the light source (or specifically, the light emitter of the light source) is configured to illuminate a given percentage of the first amount of light that is illuminated during the first period of time. The given percentage may, for example lie in a range of 25 percent to 70 percent. This can be achieved by adjusting the current supplied to the light emitter and/or by employing pulse width modulation.

It will be appreciated that when the light source is turned on or turned off, an amount of light emitted by the light emitter is controlled accordingly by the second controller.

The technical effect of the first amount of light being greater than the second amount of light is that the difference in the pixel values between the first image and the second image would be prominent, thereby facilitating the first controller to accurately determine the image intensity difference between the first image and the second image. This subsequently facilitates in identifying from the first image the illuminated at least one pixel.

Furthermore, optionally, the first amount of light is selected to be greater than a light noise level of the second image. Such a selection can be performed in an iterative manner, wherein multiple first images and second images are captured in an alternating manner. Thereafter, the first controller is optionally configured to determine the light noise level from the second image, and form instructions for the second controller accordingly. Optionally, in this regard, the second controller is configured to control the light emitter in such a manner that the light source illuminates the first amount of light which is greater than the light noise level of the second image. Herein, the term "light noise" refers to a light emitted by the external light sources present in the real-world environment whereat the tracking device is arranged. The light noise may, for example, be caused due to activation of the external light sources at a same time when the light source is also activated, emission of light of same wavelength range by the external light sources as that of by the light source, a random variation of light emitted by the external light sources, and the like. Optionally, the light noise level is determined based on the deviation in the (calculated) image intensity difference from the expected image intensity difference.

A technical benefit of selecting the first amount of light greater than the light noise level of the second image is that there is a considerable difference between the intensities of the second amount of light and the first amount of light. Due to this difference, the at least one pixel in the first image can be accurately identified. In an instance, when the first amount of light has an almost similar intensity as the second amount of light, the difference between the intensities of the first amount of light and the second amount of light will not be discernible.

Furthermore, optionally, the identified at least one pixel illuminated by the light source is used to determine a position of the light source from the first image. In this regard, after identifying the at least one pixel illuminated by the light source, the position of the light source is determined using the at least one pixel representing a 2D position of the light source in the first image. For example, when a pixel illuminated by the light source is located towards a centre in the first image, it may mean that the light source is located towards a central region in a field of view of the camera used for capturing the first image. Similarly, when the pixel illuminated by the light source is located towards a top-left region in the first image, it means that the light source is located towards a top-left region in the field of view of the camera. In this regard, a comparison between features extracted from the first image and features extracted from the second image can be performed to identify a light blob that represents the light source. In this manner, it can be determined which light blob(s) correspond to light sources illuminated by the system, and which light blobs correspond to light noise and/or other external light sources.

It will be appreciated that at least one of: a location of the at least one pixel in the image, intrinsic parameters of the camera (such as, for example, an optical centre, a focal length, and the like of the camera), extrinsic properties of the camera (such as, for example, a field-of-view of the camera, a pose of the camera at the time of capturing the first image, and the like), is known. Herein, a first pose of the camera while capturing the first image is used to determine a 3D position of the light source with respect to the camera.

A technical benefit of determining the position of the light source from the first image is that the light source can be tracked accurately from the perspective of the first pose of the camera, because the first amount of light is greater than the second amount of light, which enables in accurate identification of the at least one pixel representing the light source.

Moreover, optionally, the light source is a part of a user-interaction controller of the tracking device. Herein, the term "user-interaction controller" refers to a specialized equipment that is employed by the user to interact with the XR environment. Notably, the user interacts with the XR environment by providing input(s) to the tracking device, via the user-interaction controller. The user-interaction controller is communicably coupled to the tracking device. Herein, the coupling could be wired, wireless, or a combination thereof. The user-interaction controller is ergonomically designed to be portable, compact, and lightweight, so that the user is able to use it conveniently. Optionally, the user-interaction controller is implemented as at least one of: a keyboard, a mouse, a touchpad, a push button controller, a joystick, a gamepad, an interactive board, a tablet computer, a laptop computer, a trackball, an XR controller. Optionally, the light source is arranged on an external portion of the user-interaction controller. For example, the light source may be arranged spatially around the user-interaction controller.

It will be appreciated that in some implementations, a plurality of light sources are arranged on the user-interaction controller in a manner that the plurality of light sources sufficiently provides a complete cover of the user-interaction controller from different viewing directions, and thus facilitates in a stable and an accurate tracking of the plurality of light sources (and of the user-interaction controller). Moreover, the external portion of the user-interaction controller can be shaped like a curved loop. Optionally, in this regard, the plurality of light sources may be arranged in a non-regular manner, based on the shape of the external portion of the user-interaction controller. It is to be understood that when the camera faces the real-world environment, a whole surface area of the user-interaction controller that has the plurality of light sources arranged thereon is not completely visible from the perspective of the camera at any given time instant. Therefore, the given image only represents a part of the user-interaction controller that is visible from a given perspective of the camera. As the user interacts within the XR environment using the user-interaction controller, a position and an orientation of the user-interaction controller may continuously change.

The position and the orientation of the user-interaction controller can be determined based on the position of the light sources. Optionally, in this regard, individual light sources from amongst the plurality of light sources are turned on and off in a time-multiplexed manner (namely, one-by-one), and the first controller is configured to identify the individual light sources from a sequence of alternating first images and second images capturing the individual light sources according to the time-multiplexed manner.

The present disclosure also relates to the method as described above. Various embodiments and variants disclosed above, with respect to the aforementioned first aspect, apply mutatis mutandis to the method.

Notably, the identified at least one pixel is used to determine the position of the light source from the first image, as described earlier.

Optionally, the method further comprises using the camera for measuring a light noise level and using the light noise level to control an amount of light illuminated by the light source. Herein, the image sensor measures a total amount of light falling on said image sensor during both the first period of time and the second period of time. When the light source is optionally turned off during the second period of time, the total amount of light (from the external light sources) falling on the image sensor is regarded as the light noise, and thus some pixels of the second image would only represent the light noise level. Thus, the second controller controls the light emitter in such a manner that the first amount of light illuminated by the light source during the first period of time would be greater than the light noise level of the second image, as described earlier.

Optionally, the method further comprises measuring periodic illumination signal levels using the camera. In this regard, the camera is used to measure the amount of light falling on its image sensor from the real-world environment, when the light source is turned on or turned off periodically (i.e., in a repeating pattern or cycle). In this way, illumination signal levels during a given period of time correspond to an intensity of a given image captured during the given period of time. The technical effect of measuring the periodic illumination signal levels is to use this measurement to determine a position of the light source from the perspective of the camera. The periodic illumination signal levels can be measured by the camera using various techniques, for example, such as pulse-width modulation, sinusoidal modulation, and similar. In an example, when the pulse-width modulation may be used, the light source may be turned on and off rapidly, and an image may be captured by the camera to measure the periodic illumination signal levels. In another example, when the sinusoidal modulation is used, a level of intensity of the light source varies sinusoidally and is captured in an image by the camera to measure the periodic illumination signal levels that varies sinusoidally.

Optionally, in the method, the periodic illumination signal levels are used during the calculation of the image intensity difference between the first and the second image. The periodic illumination signal levels are used to calculate the image intensity difference between the first image and the second image in a manner similar to the calculation of the image intensity difference for each pixel in the first image and the corresponding pixel in the second image. A technical benefit of using the periodic illumination signal levels is for accurately and precisely calculating the image intensity difference, so that the at least one pixel is easily identifiable in the first image.

Optionally, the method further comprises:
  determining a deviation in the image intensity difference from an expected image intensity difference; and
  correcting an intensity of pixels in at least one of: the first image, the second image, based on the determined deviation.

Optionally, the step of correcting the intensity of the pixels is performed when the determined deviation is greater than a predefined threshold deviation.

Optionally, the identified position of the light source is used to locate a user-interaction controller associated with a head-mounted display (HMD) device. The position of the light source is used to ascertain the position of the user-interaction controller in the real-world environment with respect to the tracking device, as described earlier. This is because the light source is a part of the user-interaction controller. Hence, the identified position of the light source is approximately a position of the user-interaction controller.

Additionally, tracking the position of the light source repeatedly may also facilitate in determining a movement of the user-interaction controller in the real-world environment with respect to the tracking device. Furthermore, a perspective from which the camera captures the first image and the image intensity difference between the first image and the second image, is used to locate the user-interaction controller. Hence, the position of the light source can be triangulated to determine the location of the user-interaction controller with a high degree of accuracy.

Optionally, the method further comprises controlling the head-mounted display device using a location of the user-interaction controller. A change in the location of the user-interaction controller relative to the head-mounted display device is optionally utilised to synchronise actions performed by the user with corresponding actions in the visual scene of the XR environment provided in the HMD device in a seamless manner. This facilitates an immersive and natural experience to the user. As an example, when an exemplary user may move the user-interaction controller in a forward direction, a virtual object corresponding to the user-interaction controller in the HMD device may also move in a forward direction.

DETAILED DESCRIPTION OF THE DRAWINGS

Figure 1A:
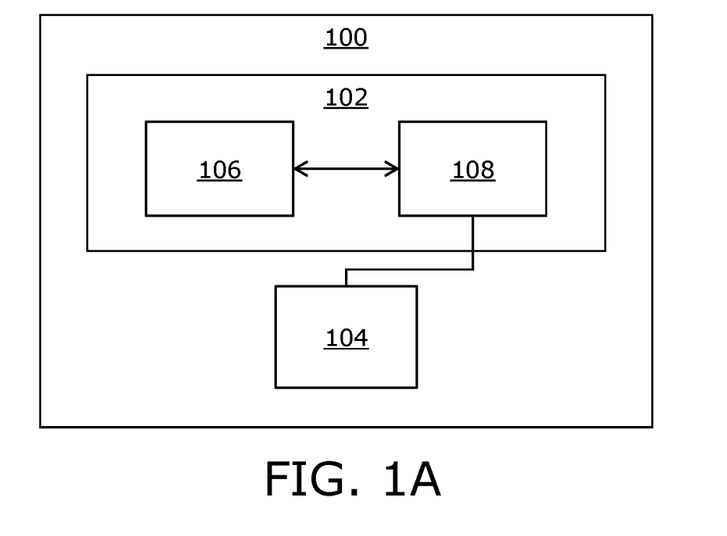
FIGS. 1A and 1B illustrates block diagrams of architectures of a system for tracking a position of a light source in a first image, in accordance with different embodiments of the present disclosure.
Figure 1B:
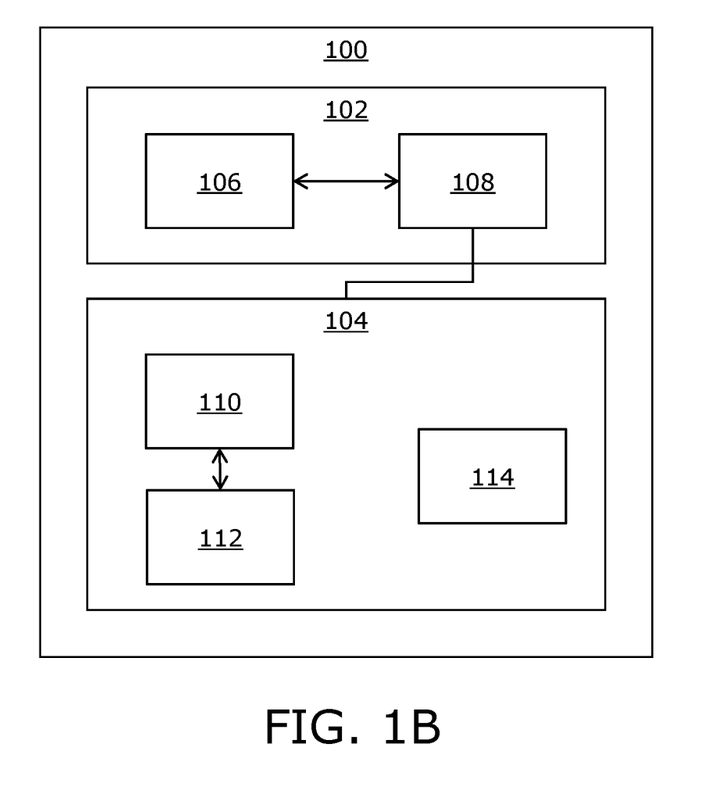

Referring to FIGS. 1A and 1B, illustrated are block diagrams of architectures of a system 100 for identifying pixels illuminated by light sources, in accordance with different embodiments of the present disclosure. In FIGS. 1A and 1B, the system 100 comprises a tracking device 102 and a light source 104. The tracking device 102 comprises a camera 106 and a first controller 108 coupled to the camera 106. The light source 104 is coupled to the first controller 108.

In FIG. 1B, the light source 104 optionally comprises a light emitter 110 and a second controller 112. The second controller 112 is coupled to the light emitter 110. Optionally, the light source 104 further comprises a reflective element 114.

It may be understood by a person skilled in the art that the FIGS. 1A and 1B includes an architecture of the system 100 for sake of clarity, which should not unduly limit the scope of the claims herein. It is to be understood that the specific implementations of the system 100 are provided as examples and are not to be construed as limiting it to specific numbers or types of cameras. The person skilled in the art will recognize many variations, alternatives, and modifications of embodiments of the present disclosure.

Figure 2:
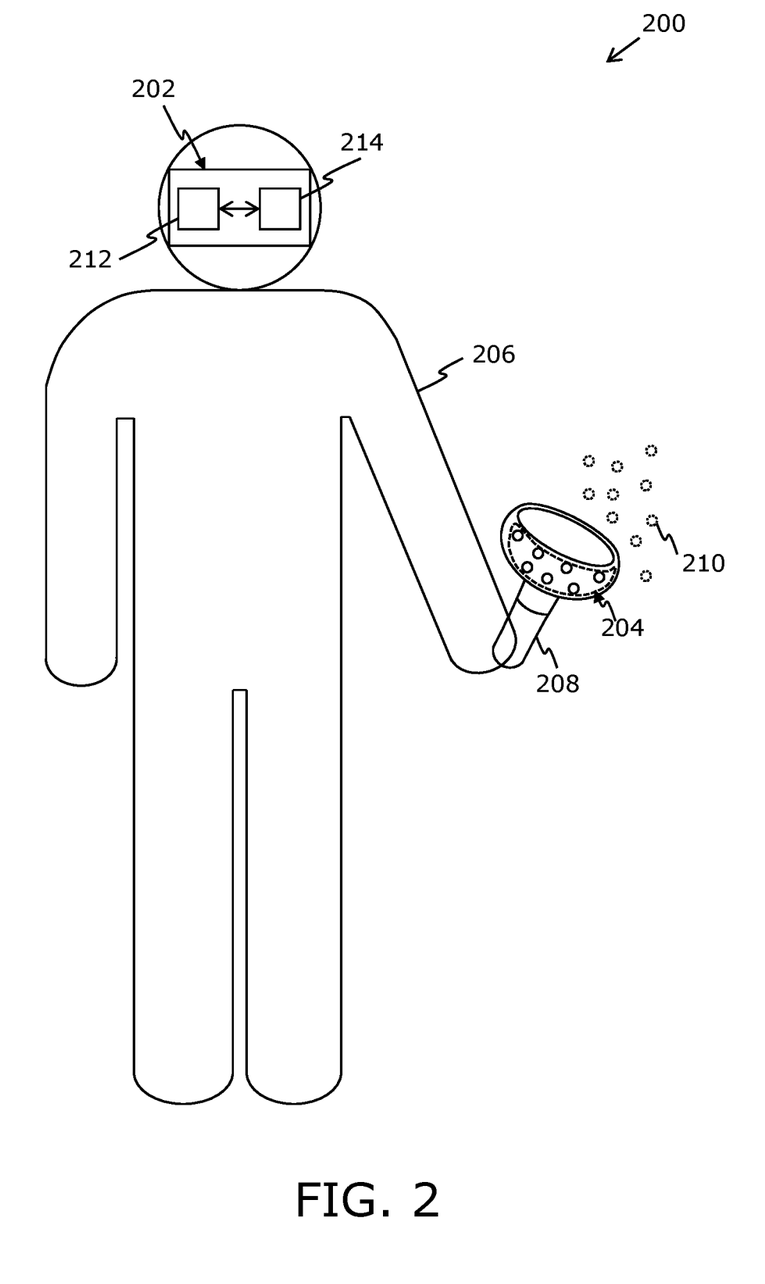
FIG. 2 illustrates an exemplary environment in which a system for tracking a position of a light source in a first image is being used, in accordance with an embodiment of the present disclosure.

Referring to FIG. 2, illustrated is an exemplary environment 200 in which a system for identifying pixels illuminated by light sources is being used, in accordance with different embodiments of the present disclosure. The system comprises a tracking device 202 and a light source 204. The tracking device 202 is depicted as a head-mounted display device worn by a user 206 on his/her head. The user 206 holds a user-interaction controller 208, wherein the light source 204 is a part of the user-interaction controller 208. Furthermore, in the environment 200, a plurality of external light sources (denoted by 210) are present which illuminate an amount of external light. The tracking device 202 comprises a camera 212 and a first controller 214 coupled to the camera 212.

FIG. 2 is merely an example, which should not unduly limit the scope of the claims herein. A person skilled in the art will recognize many variations, alternatives, and modifications of embodiments of the present disclosure.

Figure 3A:
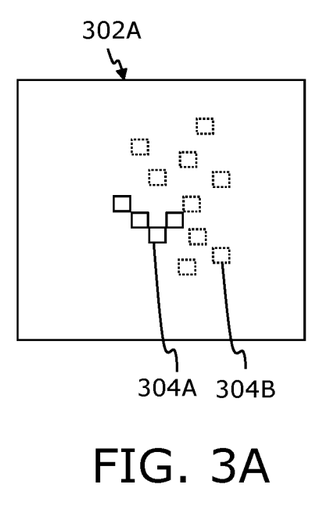
FIGS. 3A-3C illustrate a schematic representation of a first image and a second image captured by a camera, and how image intensity difference is used identify at least one pixel illuminated by a light source, in accordance with an embodiment of the present disclosure.

Referring to FIG. 3A, illustrated is an exemplary first image 302A, in accordance with an embodiment of the present disclosure. Herein, the first image 302A is captured by a camera of a tracking device, during a first period of time (t0-t1), whilst a light source illuminates a first amount of light, wherein the light source is represented by a set of pixels (as depicted by pixel 304A), wherein the set of pixels are depicted by solid rectangles. Similarly, external light sources illuminate an amount of external light, wherein the external light sources are depicted by another set of pixels (as depicted by another pixel 304B), wherein the another set of pixels are depicted by round dotted rectangles.

Figure 3B:
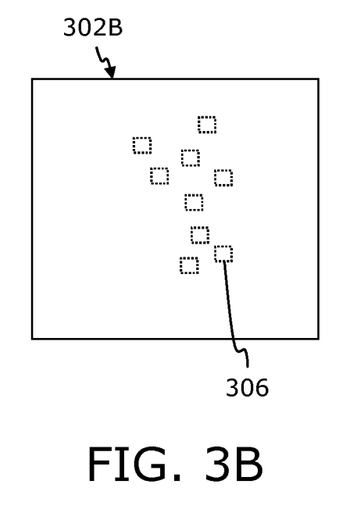

Referring to FIG. 3B, illustrated is an exemplary second image 302B, in accordance with an embodiment of the present disclosure. Herein, the second image 302B is captured by the camera of the tracking device, during a second period of time (t2-t3), whilst the light source illuminates a second amount of light, and the external light source illuminates the amount of external light in a manner similar to the illumination of the amount of external light during the first period of time. Since the first amount of light is greater than the second amount of light, and the second amount of light is optionally almost zero, the light source is not represented in the second image 302B. However, the external light sources are depicted by yet another set of pixels (as depicted by yet another pixel 306), wherein the yet another set of pixels are depicted in a manner similar to the depiction of the another set of pixels.

Figure 3C:
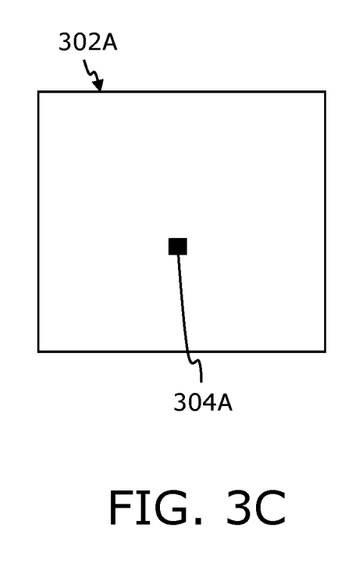

Referring to FIG. 3C, there is shown an identified at least one pixel 304A in the first image 302A, in accordance with an embodiment of the present disclosure. In this regard, a first controller (which is coupled to the camera) is configured to calculate an image intensity difference between the first image 302A and the second image 302B. An image intensity difference between pixels of the first image 302A and corresponding pixels of the second image 302B is determined to identify the pixel 304A in the first image 302A that represents the light source.

FIGS. 3A-3C are merely examples, which should not unduly limit the scope of the claims herein. A person skilled in the art will recognize many variations, alternatives, and modifications of embodiments of the present disclosure.

Figure 4:
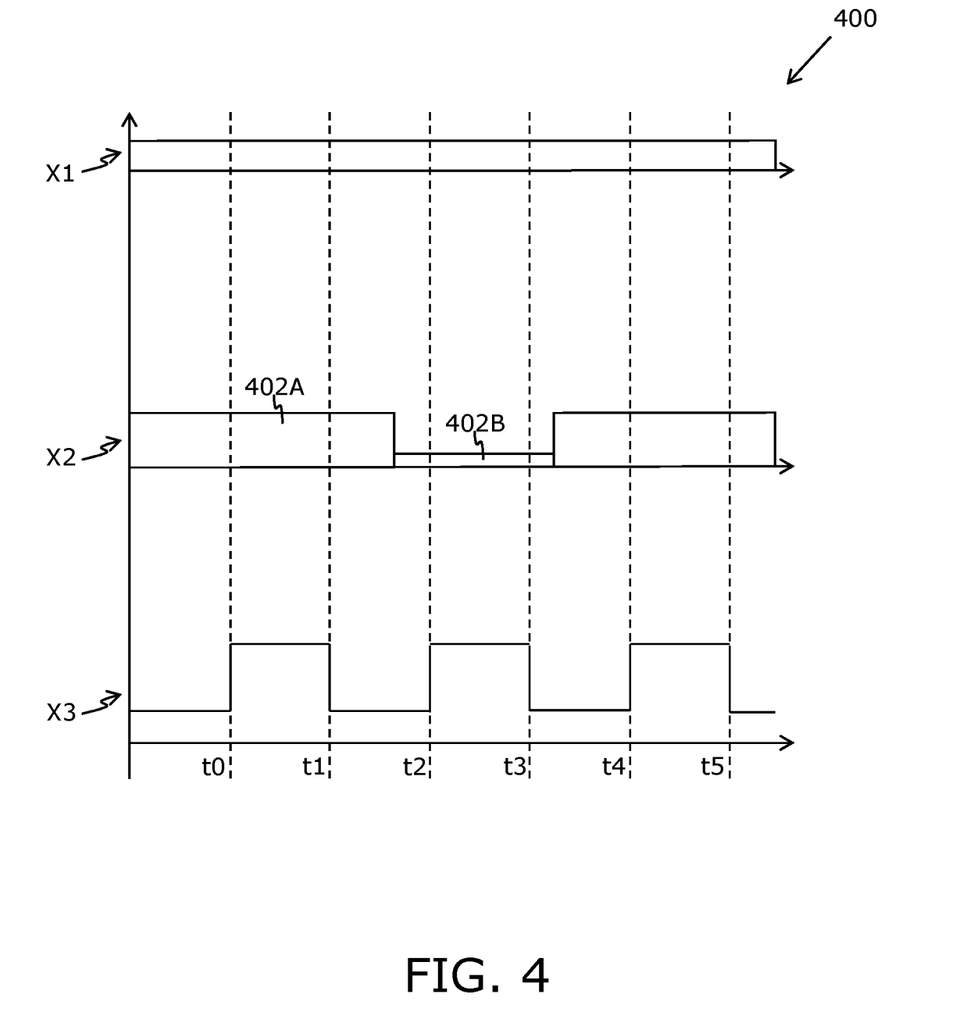
FIG. 4 illustrates an exemplary graphical implementation of how a first image and a second image are captured, in accordance with an embodiment of the present disclosure.

Referring to FIG. 4, illustrated is an exemplary graphical implementation 400 of how a first image and a second image are captured, in accordance with an embodiment of the present disclosure. The graphical implementation 400 includes three graphs, namely X1, X2 and X3. Herein, horizontal axes of the three graphs X1-X3 represents time (as shown by t0, t1, t2, t3, t4, t5, and so forth). In the graph X1, a vertical axis represents an amount of light emitted from external light sources and/or background noise. In the graph X2, a vertical axis represents an amount of light illuminated by a light source. In the graph X3, a vertical axis represents periods of time in which a camera is exposed to capture the first image and the second image during a first period of time (t0-t1) and a second period of time (t2-t3), respectively.

As shown in the graph X1, the amount of light emitted by the external light sources and/or the background noise either stays constant or varies randomly. In the graph X2, the light source illuminates a first amount of light 402A when the light source is turned on, and a second amount of light 402B when the light source is turned off or dimmed. The first amount of light 402A is greater than the second amount of light 402B. In the graph X3, it is shown that an image intensity of the first image is due to a combination of an intensity of the first amount of light 402A along with an intensity of the amount of light emitted by the external light sources and/or the background noise. Successively, an image intensity of the second image is due to a combination of an intensity of the second amount of light 402B along with the intensity of the amount of light emitted by the external light sources and/or the background noise.

FIG. 4 is merely an example, which should not unduly limit the scope of the claims herein. A person skilled in the art will recognize many variations, alternatives, and modifications of embodiments of the present disclosure.

Figure 5:
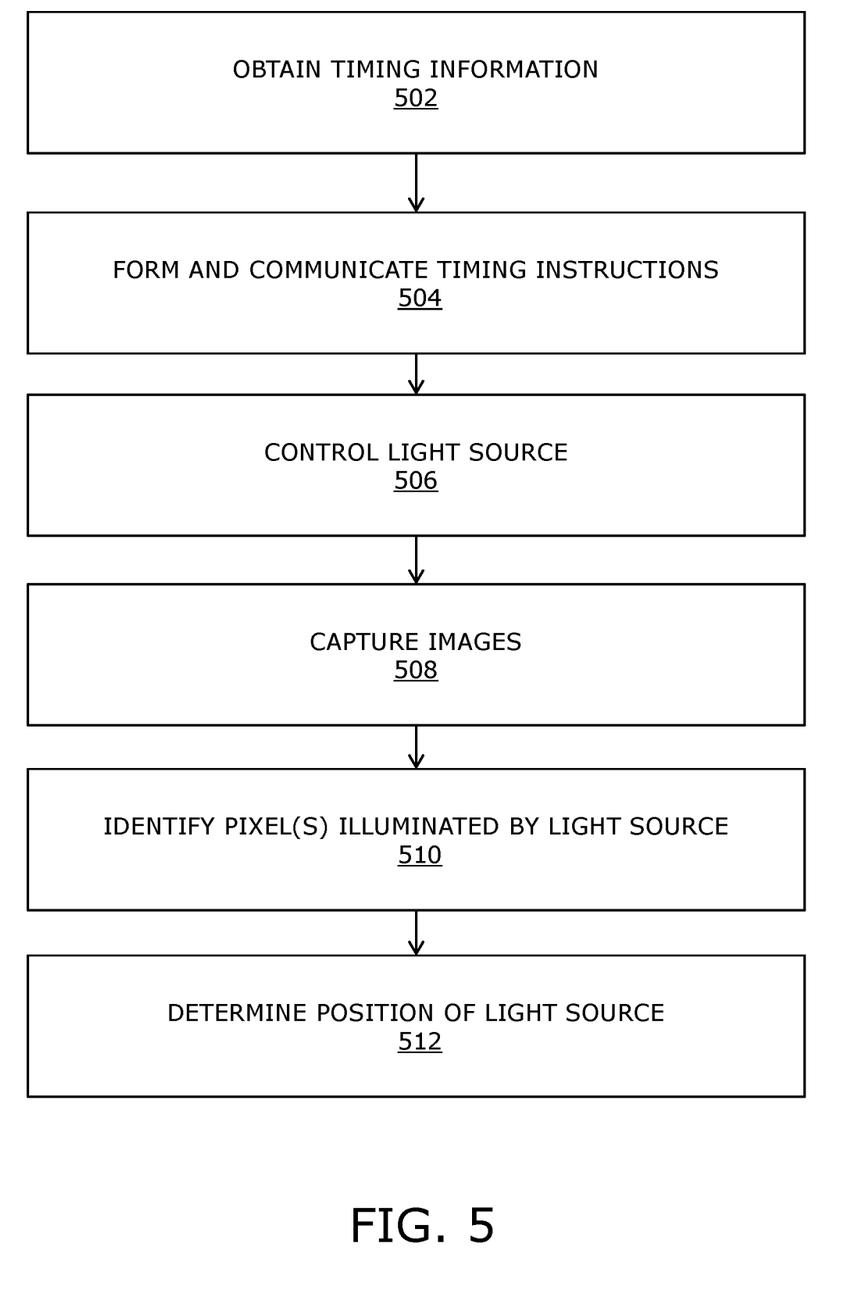
FIG. 5 illustrates a flowchart for steps of a method for tracking a position of a light source in a first image, in accordance with an embodiment of the present disclosure.

Referring to FIG. 5, illustrated is a flowchart depicting steps of a method for tracking a position of a light source in a first image, in accordance with an embodiment of the present disclosure. At step 502, a first timing information associated with a first period of time (t0-t1) and a second timing information associated with a second period of time (t2-t3) are obtained, wherein the first period of time and the second period of time do not overlap. At step 504, timing instructions are formed based on the first timing information and the second timing information, and communicated to the light source over a communication interface. At step 506, the timing instructions are used to control the light source to illuminate a first amount of light during the first period of time and a second amount of light during the second period of time. At step 508, a first image and a second image are captured, with a camera, during the first period of time (t0-t1) and the second period of time (t2-t3), respectively. At step 510, at least one pixel illuminated by the light source is identified from the first image, by calculating an image intensity difference between the first image and the second image. At step 512, the identified at least one pixel is used to determine a position of the light source from the first image.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system comprising a head mounted display tracking device and a light source, wherein the head mounted display tracking device comprises a camera and a first controller coupled to the camera, the first controller being configured to:
obtain a first timing information associated with a first period of time (t0-t1) and a second timing information associated with a second period of time (t2-t3), wherein the first period of time and the second period of time do not overlap;
form timing instructions based on the first timing information and the second timing information;
communicate the timing instructions to the light source over a communication interface; and control the camera to capture a first image and a second image during the first period of time (t0-t1) and the second period of time (t2-t3), respectively;

wherein the light source is configured to use the timing instructions to illuminate a first amount of light during the first period of time and a second amount of light during the second period of time, and wherein the first controller is further configured to:
calculate a pixel specific intensity difference between the first image and the second image;
identify from the first image a region of interest comprising at least one pixel illuminated by the light source based on the pixel specific intensity difference; and
determine a position of the light source relative to the head-mounted display tracking device based on the identified region of interest.

2. The system according to claim 1, wherein the light source comprises a light emitter and a second controller, wherein the second controller is configured to receive the timing instructions and control the light emitter based on the timing instructions.

3. The system according to claim 2, wherein the light source further comprises a reflective element, wherein the reflective element reflects the light of the light emitter.

4. The system according to claim 1, wherein the head mounted display tracking device is a head-mounted display device.

5. The system according to claim 1, wherein the light source is a part of a user-interaction controller of the head mounted display tracking device.

6. The system according to claim 1, wherein the at least one pixel illuminated by the light source is used to determine a position of the light source from the first image.

7. The system according to claim 1, wherein the first amount of light is greater than the second amount of light.

8. The system according to claim 7, wherein the first amount of light is selected to be greater than a light noise level of the second image.

9. The system according to claim 1, wherein the first amount of light corresponds to turning the light source on and the second amount of light corresponds to turning the light source off.

10. The system according to claim 1, wherein the first controller is configured to:
determine a deviation in the pixel specific intensity difference from an expected pixel specific intensity difference; and
correct an intensity of pixels in at least one of: the first image, the second image, based on the determined deviation.

11. The system according to claim 10, wherein the first controller is configured to correct the intensity of the pixels in the at least one of: the first image, the second image, when the determined deviation is greater than a predefined threshold deviation.

12. A method for tracking a position of a light source relative to a head mounted display tracking device, the method comprising:
obtaining a first timing information associated with a first period of time (t0-t1) and a second timing information associated with a second period of time (t2-t3), wherein the first period of time and the second period of time do not overlap;
forming timing instructions based on the first timing information and the second timing information, and communicating the timing instructions to the light source over a communication interface;
using the timing instructions to illuminate a first amount of light during the first period of time and a second amount of light during the second period of time;
capturing, with a camera, a first image and a second image during the first period of time and the second period of time, respectively;
calculating a pixel intensity difference between the first image and the second image;
identifying from the first image a reason of interest comprising at least one pixel illuminated by the light source, based on the pixel specific intensity difference; and
using the identified region of interest to determine a position of the light source relative to the head mounted display.

13. The method according to claim 12, further comprising using the camera for measuring a light noise level and using the light noise level to control an amount of light illuminated by the light source.

14. The method according to claim 12, further comprising measuring periodic illumination signal levels using the camera.

15. The method according to claim 14, wherein the periodic illumination signal levels are used during the calculation of the pixel intensity difference between the first image and the second image.

16. The method according to claim 12, wherein the identified position of the light source is used to locate a user-interaction controller associated with the head-mounted display device.

17. The method according to claim 16, wherein the method further comprises controlling the head-mounted display device using a location of the user-interaction controller.

18. The method according to claim 12, further comprising:
determining a deviation in the pixel intensity difference from an expected pixel intensity difference; and
correcting an intensity of pixels in at least one of: the first image, the second image, based on the determined deviation.

19. The according to claim 18, wherein the step of correcting the intensity of the pixels is performed when the determined deviation is greater than a predefined threshold deviation.

* * * * *